(12) United States Patent
Chen et al.

(10) Patent No.: US 12,228,981 B2
(45) Date of Patent: Feb. 18, 2025

(54) HOUSING WITH ONE OR MORE AIRFLOW ELEMENTS

(71) Applicant: Quanta Computer Inc., Taoyuan (TW)

(72) Inventors: Chao-Jung Chen, Taoyuan (TW); Yu-Nien Huang, Taoyuan (TW); Jen-Hui Wang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 350 days.

(21) Appl. No.: 17/873,397

(22) Filed: Jul. 26, 2022

(65) Prior Publication Data

US 2023/0341911 A1 Oct. 26, 2023

Related U.S. Application Data

(60) Provisional application No. 63/333,377, filed on Apr. 21, 2022.

(51) Int. Cl.
*G06F 1/18* (2006.01)
*G06F 1/20* (2006.01)

(52) U.S. Cl.
CPC .............. *G06F 1/206* (2013.01); *G06F 1/181* (2013.01); *G06F 1/187* (2013.01)

(58) Field of Classification Search
CPC ........... G06F 1/181; G06F 1/187; G06F 1/206
See application file for complete search history.

(56) References Cited

U.S. PATENT DOCUMENTS

| | | | | |
|---|---|---|---|---|
| 5,136,464 | A * | 8/1992 | Ohmori | H05K 7/20572 361/724 |
| 5,297,005 | A * | 3/1994 | Gourdine | H05K 7/20154 361/695 |
| 9,915,985 | B1 * | 3/2018 | Chen | H05K 7/20736 |
| 10,506,737 | B1 * | 12/2019 | Costello | H05K 7/20209 |
| 2005/0233688 | A1 * | 10/2005 | Franz | F04D 29/329 454/157 |
| 2014/0085819 | A1 * | 3/2014 | Wang | H05K 7/20136 361/692 |

* cited by examiner

*Primary Examiner* — Mark A Connolly
(74) *Attorney, Agent, or Firm* — NIXON PEABODY LLP

(57) ABSTRACT

A system is disclosed. The system includes a housing having a top wall, a bottom wall, and two opposing side walls extending generally between and connecting the top wall to the bottom wall. The housing further has an airflow inlet and an airflow outlet opposing the airflow inlet. The system further includes a plurality of components within the housing. The plurality of components are arranged in rows with spaces between the rows. The system further includes a board coupled to the plurality of components on a first side and coupled to the bottom wall of the housing on a second side, opposing the first side. The board includes an aperture. The board and the bottom wall of the housing define a channel. The system further includes one or more of an injection ramp, a diversion ramp, and/or an airfoil for directing airflow within the housing.

18 Claims, 7 Drawing Sheets

HOUSING WITH ONE OR MORE AIRFLOW ELEMENTS

CROSS-REFERENCE TO RELATED APPLICATIONS

This application claims priority from and benefit of U.S. Provisional Patent Application Ser. No. 63/333,377, filed on Apr. 21, 2022, titled "High Efficiency Multiple Jet Flow Generator for Cooling Storage Product," which is hereby incorporated by reference herein in its entirety.

FIELD OF THE INVENTION

The present invention relates generally to a housing for containing one or more components, and more specifically, to a housing with airflow control for cooling the one or more components.

BACKGROUND OF THE INVENTION

Housings are common for holding one or more components in various different technologies. For example, computer systems include various housings for holding memory devices, storage devices, and the like. Such housings can present issues with respect to cooling the housed components because the housing itself may restrict or limit airflow over the components. For example, as airflow passes over the components, the airflow may heat up such that the airflow exiting the housing is hotter than the airflow entering the housing. The hotter airflow at the exit of the housing provides little cooling to the components near the exit of the housing. FIGS. 1-3 show a housing 100 that suffers from such issues.

Referring to FIG. 1, the housing 100 includes a pair of opposing side walls 102 that are between and connect to a top wall 104 and a bottom wall 106. The housing 100 includes an airflow inlet 112, in which cooling air flows in, as represented by the arrow 116, and an airflow outlet 114, out of which the heated cooling air flows, as represented by the arrow 118.

Referring to FIGS. 1 and 2, within the housing 100 is an array 108 of components 200 (FIG. 2), such as memory devices, storage devices, and the like. The components 200 generate heat that must be dissipated by the cooling airflow 116. The array 108 of components 200 are connected to a board 110, such as circuit board, on a first side 110a of the board 110. The board 110 is connected to the bottom wall 106 of the housing 100 on a second side 110b of the board 110, opposing the first side 110a. The components 200 are arranged in the array 108 so as to form spaces 202 between adjacent components 200. The cooling airflow 116 flows within the spaces 202 between the components 200 to cool the components 200.

As the cooling airflow 116 flows into the inlet 112, the cooling airflow 116 is heated from heat generated by the components 200. Thus, the heated airflow 118 is hotter than the cooling airflow 116; and even more so closer to the outlet 114. Accordingly, the array 108 of components 200 near the outlet 114 receive less cooling from the heated airflow 118 than the array 108 of components 200 near the inlet 112 from the cooling airflow 116. The housing 100 limits the effectiveness of the cooling air based on the confines of the side walls 102, top wall 104, and bottom wall 106.

Referring to FIG. 3, in some embodiments, between the board 110 and the bottom wall 106 is a channel 300. The channel 300 allows channel airflow, represented by the arrow 302, to flow below the board 110. The board 110 can further include an aperture 304. Some of the channel airflow 302 can pass through the aperture 304, as represented by the arrow 306, and into the compartment 308 of the housing that includes the arrow 108 of components 200. There, the channel airflow 302 can mix with the heated airflow 118 such that the channel airflow 302 can cool the heated airflow 118, producing cooler airflow, as represented by the arrow 310, for cooling a remainder of the array 108 of components 200 downstream from the aperture 304. While this configuration allows for improved cooling, little airflow passes through the aperture 304 because the channel airflow 302 predominantly passes by, rather than passes through, the aperture 304.

Accordingly, there is the need for housings that do not suffer from the above-described issues, among others.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a system is disclosed. The system includes a housing having a top wall, a bottom wall, and two opposing side walls extending generally between and connecting the top wall to the bottom wall. The housing further has an airflow inlet and an airflow outlet opposing the airflow inlet. The system further includes a plurality of components within the housing. The plurality of components are arranged in rows with spaces between the rows. The system further includes a board coupled to the plurality of components on a first side and coupled to the bottom wall of the housing on a second side, opposing the first side. The board includes an aperture. The board and the bottom wall of the housing define a channel. The system further includes one or more of an injection ramp, a diversion ramp, and/or an airfoil. The injection ramp is located within the channel and configured to direct channel airflow from within the channel, through the aperture, and between the plurality of components. The diversion ramp is coupled to the first side of the board and located within one of the spaces between the rows of the plurality of components upstream from the aperture. The diversion ramp is configured to divert housing airflow through the housing away from the aperture. The airfoil is located within one of the spaces between the rows and configured to separate the housing airflow within the one of the spaces between the rows containing the airfoil.

Another aspect of the system is the injection ramp including a curved surface that is configured to direct the channel airflow from within the channel, through the aperture, and between the plurality of components. Another aspect of the system is the injection ramp including a column that divides the curved surface into a first side curved surface and a second side curved surface, opposite the column from the first side curved surface. Another aspect of the system is the first side curved surface and the second side curved surface having airflow entrances that are wider than airflow exits such that the channel airflow over the first side curved surface and the second side curved surface accelerates between the airflow entrances and the airflow exits. Another aspect of the system is the column including curved side column surfaces such that the first side curved surface and the second side curved surface have the airflow entrances that are wider than the airflow exits. Another aspect of the system is a width of the injection ramp being generally equal to a width of the aperture. Another aspect of the system is the diversion ramp including a base coupled to the first side of the board and a curved surface generally opposite the base that is configured to divert the housing airflow away from the aperture. Another aspect of the system is the curved surface having a shape of a quadratic curve. Another aspect of the system is a width of the diversion ramp being generally equal to a width of the one of the spaces between the rows of the plurality of components containing the diversion ramp. Another aspect of the system is the airfoil including a curved leading edge, a curved first surface continuing from the curved leading edge, and a flat second surface that extends from the curved leading edge opposite from the curved first surface. Another aspect of the system is the curved first surface facing towards the aperture and the flat second surface faces away from the aperture. Another aspect of the system is the flat second surface being arranged generally oblique to the top wall and the bottom wall of the housing. Another aspect of the system is the flat second surface being arranged to direct housing airflow away from the aperture. Another aspect of the system is a width of the airfoil being generally equal to a width of the one of the spaces between the rows plurality of components containing the airfoil.

According to certain aspects of the present disclosure, a system is disclosed. The system includes a housing having an airflow inlet and an airflow outlet opposing the airflow inlet. The system further includes a plurality of components arranged in rows with spaces between the rows. The system further includes a board including an aperture. The board and the housing define a channel. The system further includes an injection ramp located within the channel and configured to direct channel airflow from within the channel, through the aperture, and between the plurality of components. The system further includes a diversion ramp coupled to the board and located within one of the spaces between the rows upstream from the aperture. The diversion ramp is configured to divert housing airflow through the housing away from the aperture. The system further includes an airfoil located within one of the spaces between the rows. The airfoil is configured to separate the housing airflow within the one of the spaces between the rows containing the airfoil.

According to certain aspects of the present disclosure, a method is disclosed. The method includes diverting housing airflow through a housing away from an aperture. The housing has an airflow inlet and an airflow outlet opposing the airflow inlet. The aperture is included in a board that defines a channel with the housing. A plurality of components is arranged within the housing in rows with spaces between the rows. The method further includes directing channel airflow from within the channel, through the aperture, and between the plurality of components. The method further includes separating the housing airflow via an airfoil located within one of the spaces between the rows. The housing airflow is separated within the one of the spaces between the rows containing the airfoil.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1:
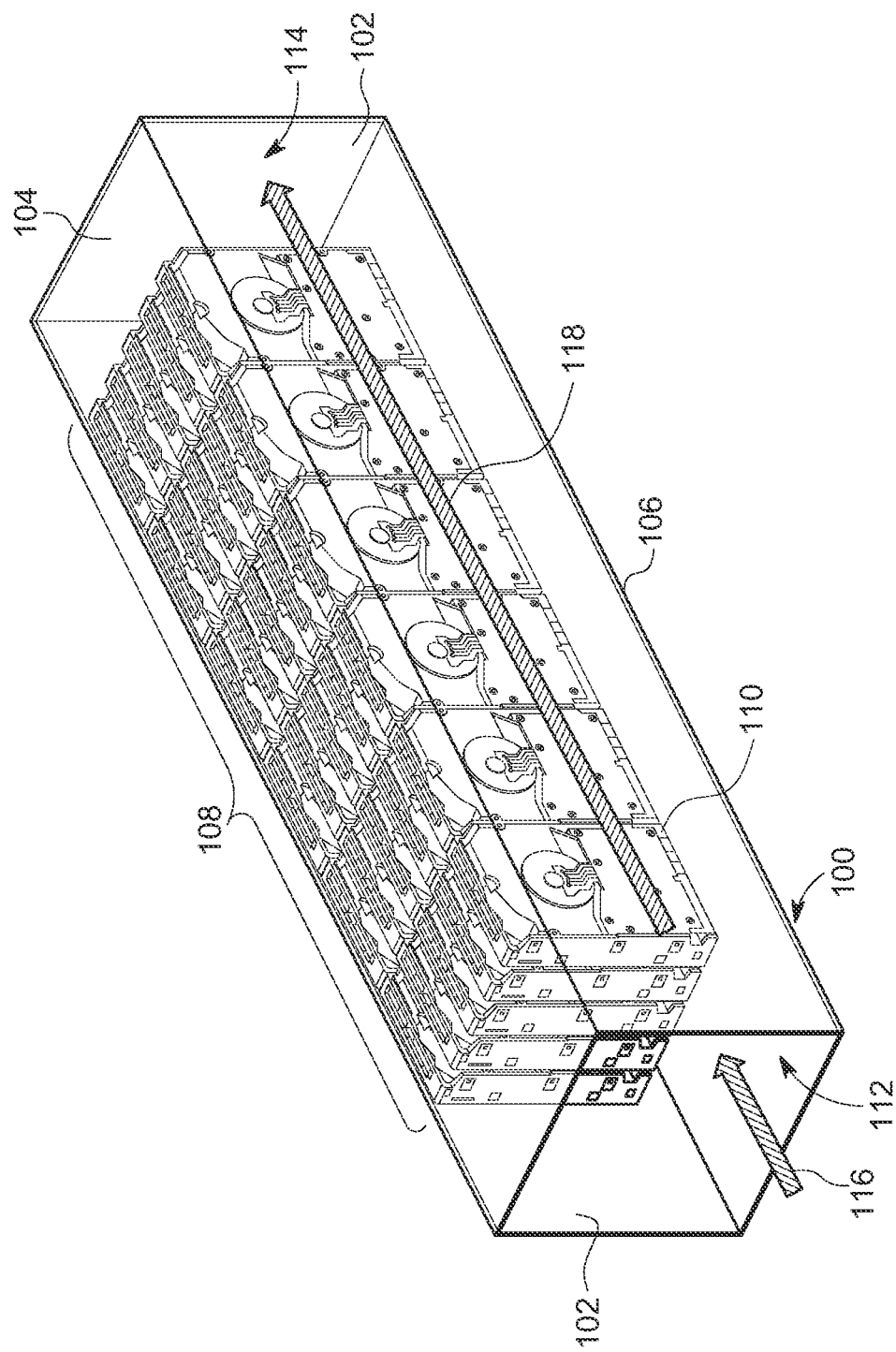
FIG. 1 is a semi-transparent perspective view showing a conventional housing.

The present disclosure is directed to a housing with one or more elements configured to control airflow within the housing. According to some embodiments, the one or more elements can include one or more injection ramps that transfer airflow from a channel within the housing to a compartment of the housing that holds components. According to some embodiments, the one or more elements can include one or more diversion ramps that fit between components within the housing to divert airflow within the housing. According to some embodiments, the one or more elements can include one or more airfoils that also fit between components within the housing to separate airflow within the housing.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 2:
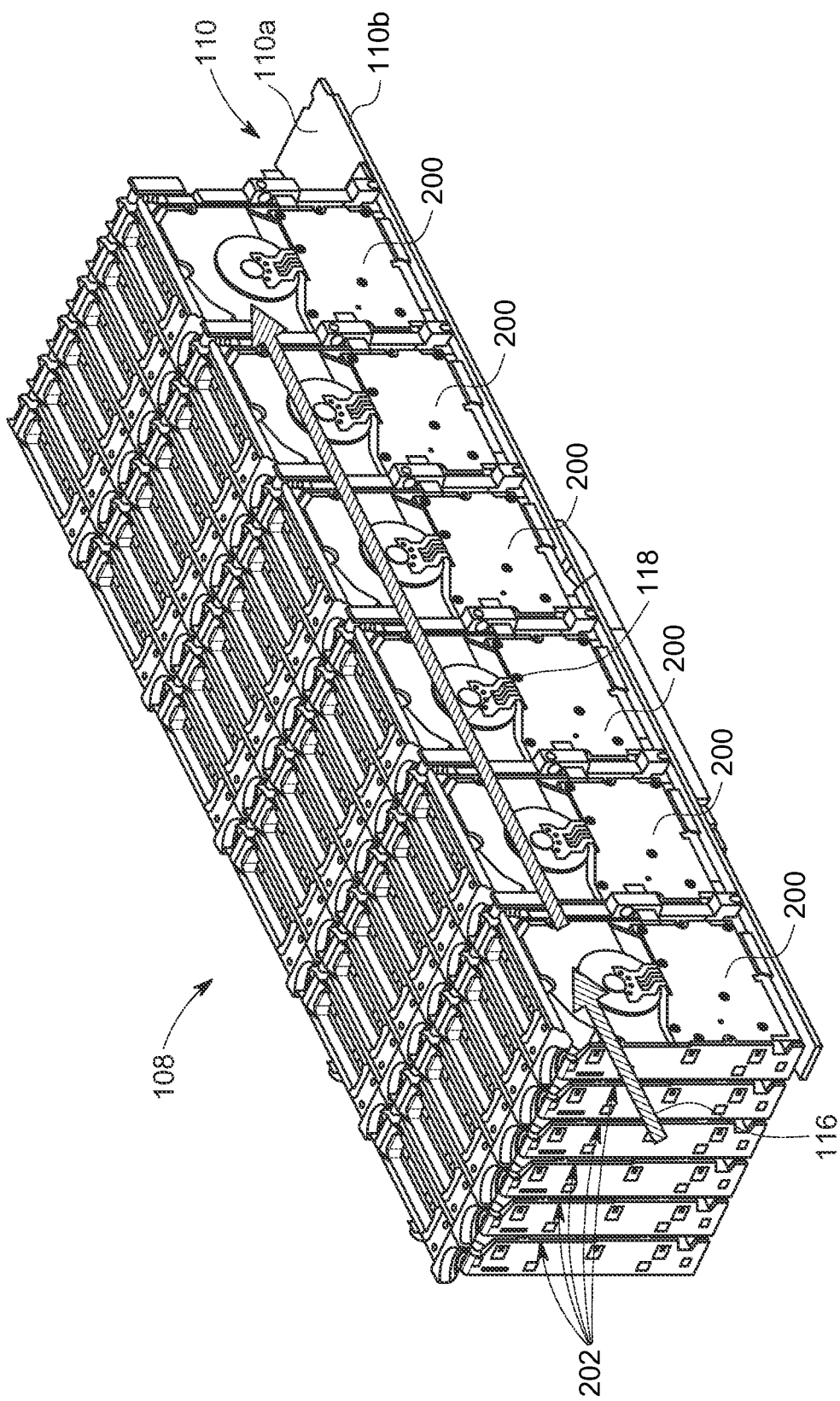
FIG. 2 is a perspective view showing an array of components within the housing of FIG. 1.
Figure 3:
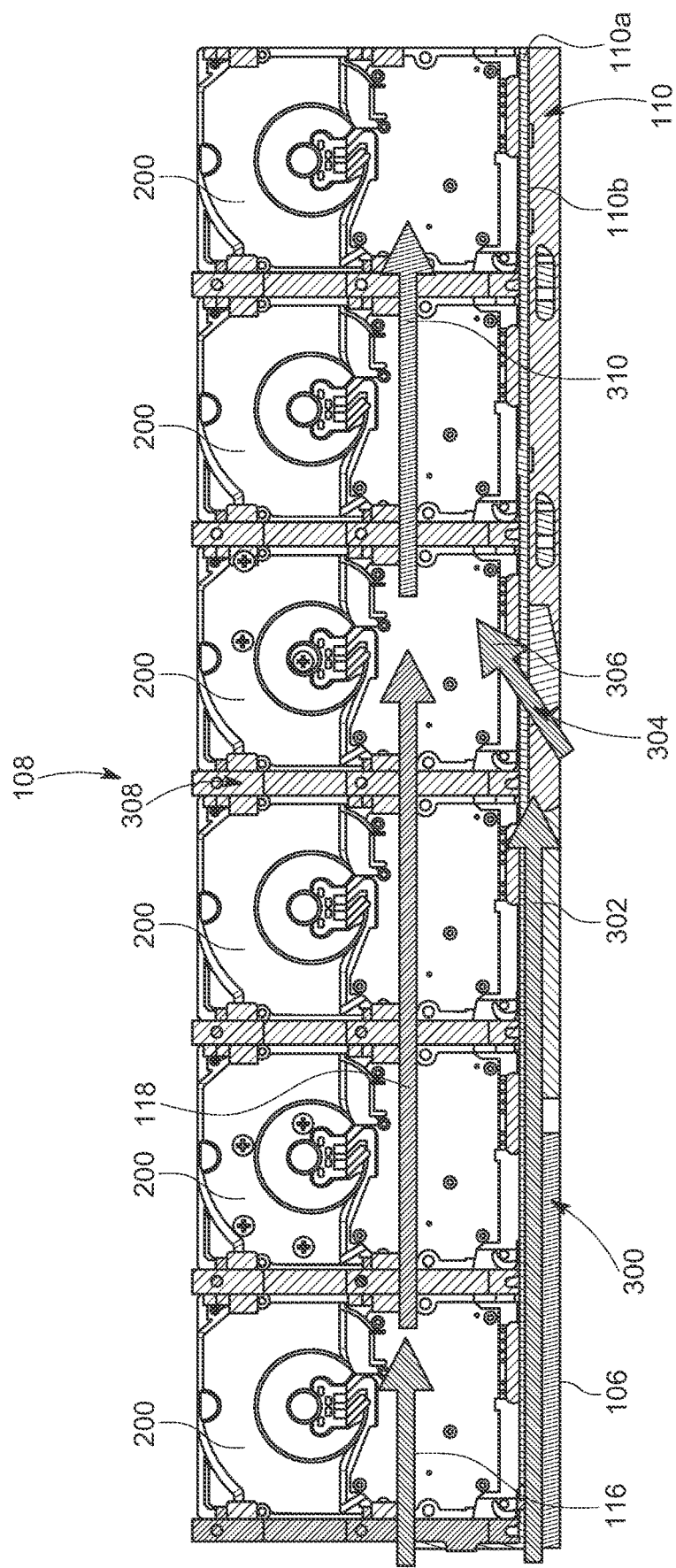
FIG. 3 is a side view showing airflow within the housing of FIG. 1.
Figure 4:
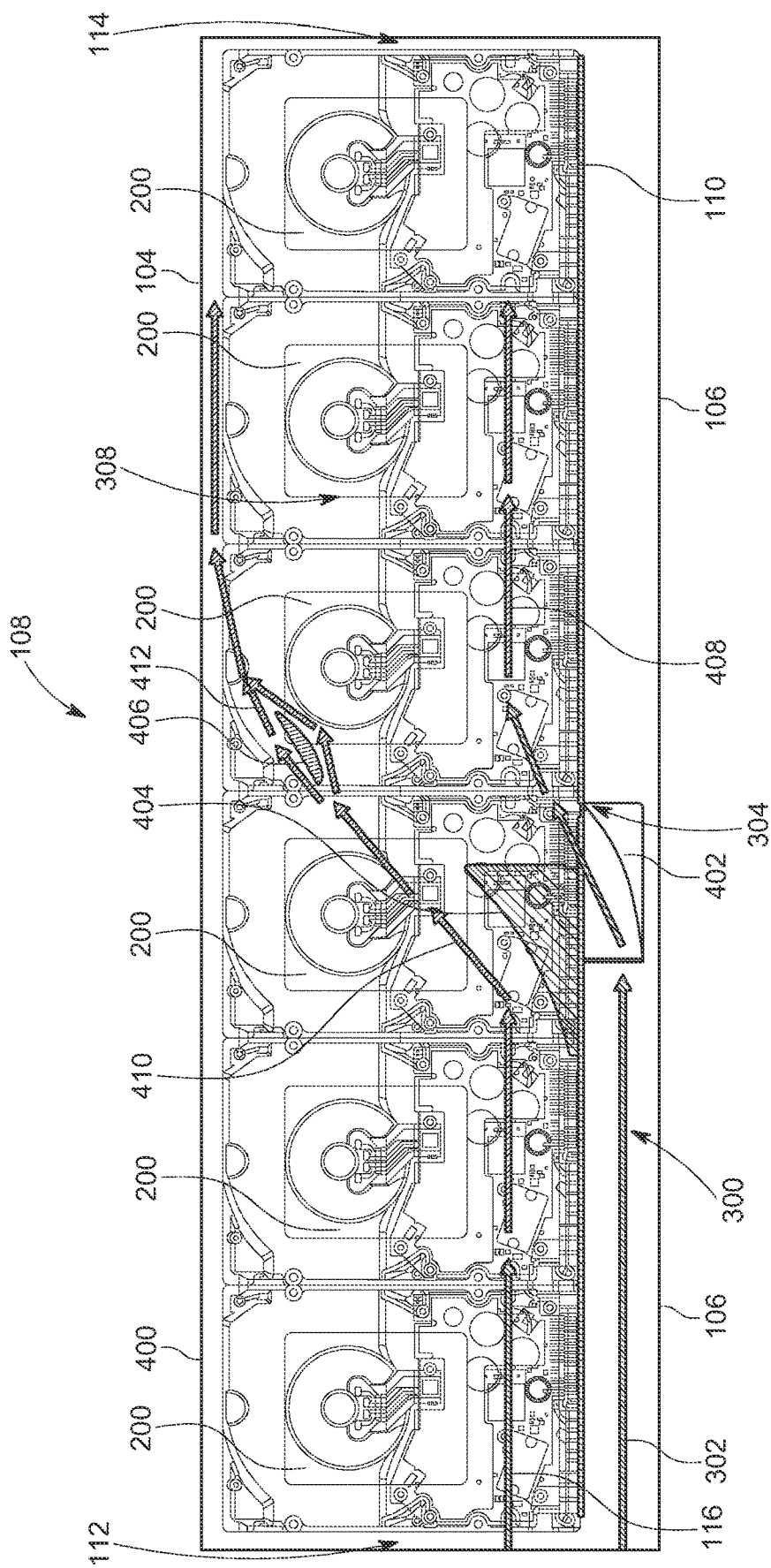
FIG. 4 is a side view showing a housing with elements for directing airflow within the housing, according to certain aspects of the present disclosure.

Referring to FIG. 4, shown is a side view of a housing 400 that includes elements for controlling airflow, according to certain aspects of the present disclosure. Element numbers in FIG. 4 that are the same as element numbers in FIGS. 1-3 are the same element, unless otherwise described below. Thus, the housing 400 includes generally the same structure as the housing 100 discussed above and shown in FIGS. 1-3 except for the addition of the following elements. Namely, the housing 400 includes an injection ramp 402 located within the channel 300. The injection ramp 402 can be coupled to one or both of the bottom wall 106 of the housing 400 and the board 110. In the embodiment shown in FIG. 4, the injection ramp 402 is coupled to the board 110.

The injection ramp 402 is positioned within the housing 400 to direct channel airflow 302 from within the channel 300, through the aperture 304, and between the plurality of components 200 within the compartment 308 of the housing 400. Thus, the injection ramp 402 urges the channel airflow 302 into the aperture 304 rather than most of the channel airflow 302 passing by the aperture 304, as what occurs for the housing 100 described above. After the channel airflow 302 is urged into the compartment 308, it is heated to generate heated diverted airflow 408, which is cooler than if the cooling airflow 116 had traveled through the housing 400 and reached the same point because the heated diverted airflow 408 only begins heating generally after passing through the aperture 304, much farther down the housing 400 than the inlet 112.

The housing 400 also includes a diversion ramp 404. The diversion ramp 404 is coupled to the first side 110a of the board 110. The diversion ramp 404 also is within one of the spaces 202 between adjacent components 200. Alternatively, the diversion ramp 404 can be between an outer most component 200 and one of the side walls 102 (FIG. 1). The diversion ramp 404 is configured to generate diverted airflow 410 by diverting the cooling airflow 116 away from the aperture 304. Thus, the diversion ramp 404 is located upstream from the aperture 304.

The housing 400 also includes an airfoil 406. The airfoil 406 sits within one of the spaces 202 between adjacent components 200. Alternatively, the airfoil 406 can be between an outer most component 200 and one of the side walls 102 (FIG. 1). The airfoil 406 is configured to separate the diverted airflow 410 into separated airflow 412 within the space 202, discussed further below.

Although FIG. 4 shows only one of each of the injection ramp 402, the diversion ramp 404, and the airfoil 406, the housing 400 can include any number of each element. In particular, where the housing 400 includes more than one aperture 304, the housing 400 can include an injection ramp 402, a diversion ramp 404, or both for the number of apertures 304. The housing 400 also can have one or more diversion ramps 404 and airfoils 406 for each one of the spaces 202 (FIG. 2) between components 200.

Figure 5:
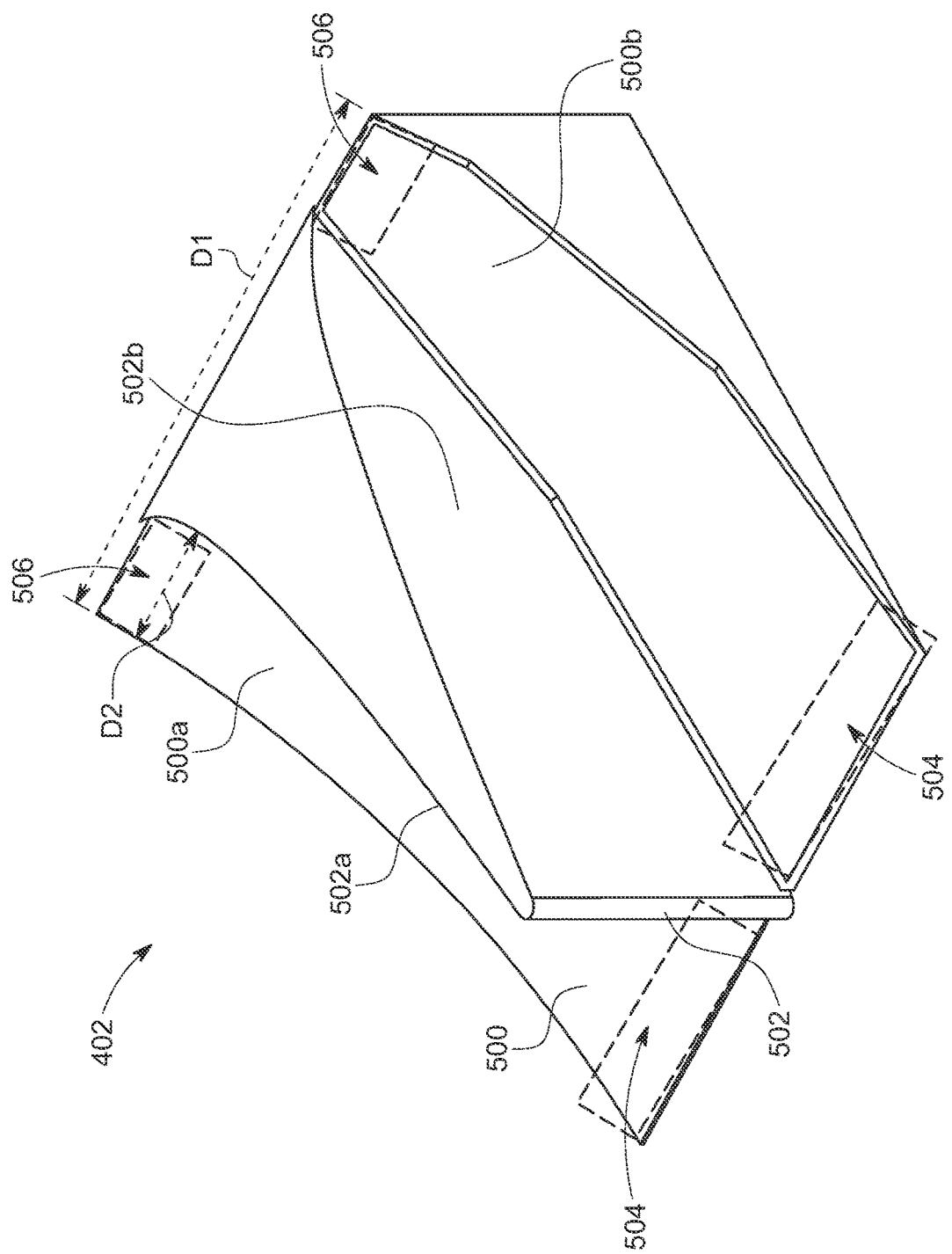
FIG. 5 is a perspective view showing one of the elements in FIG. 4, according to certain aspects of the present disclosure.

FIG. 5 shows a perspective view of the injection ramp 402, according to certain aspects of the present disclosure. The injection ramp 402 includes a surface 500 that urges the channel airflow 302 into the aperture 304. The surface 500 can be any type of inclined surface that urges the channel airflow 302 (FIG. 4) into the aperture 304. According to some embodiments, the surface 500 can be curved, as shown in FIG. 5.

The surface 500 can be a single continuous surface. According to some embodiments, and as shown in FIG. 5, the injection ramp 402 can include a column 502 that divides the surface 500 into a first side curved surface 500a and a second side curved surface 500b, opposite the column 502 from the first side curved surface 500a. The column 502 can be any structure that divides the surface 500 into the first side curved surface 500a and the second side curved surface 500b.

According to some embodiments, and as shown in FIG. 5, the column 502 can include angled side surfaces 502a and 502b such that the column 502 forms the shape of a wedge. Further, the angled side surfaces 502a and 502b can be curved, forming curved side column surfaces 502a and 502b, respectively. As a result, the wedge-shaped column 502, along with the curved side column surfaces 502a and 502b, the first side curved surface 500a and the second side curved surface 500b have airflow entrances 504 that are wider than the airflow exits 506. The airflow entrances 504 being wider than the airflow exits 506 causes airflow (e.g., channel airflow 302) over the first side curved surface 500a and the second side curved surface 500b to accelerate prior to passing through the aperture 304. The acceleration aids in injecting airflow into the compartment 308 of the housing 400 with the components 200.

The width D1 of the injection ramp 402 generally can be the same width as the aperture 304 (FIG. 4). Alternatively, the width D2 of the airflow exits 506 generally can each be the same width as the aperture 304 (FIG. 4), such as where the board 110 includes multiple apertures 304 and each airflow exit 506 aligns with one of the apertures 304.

Figure 6:
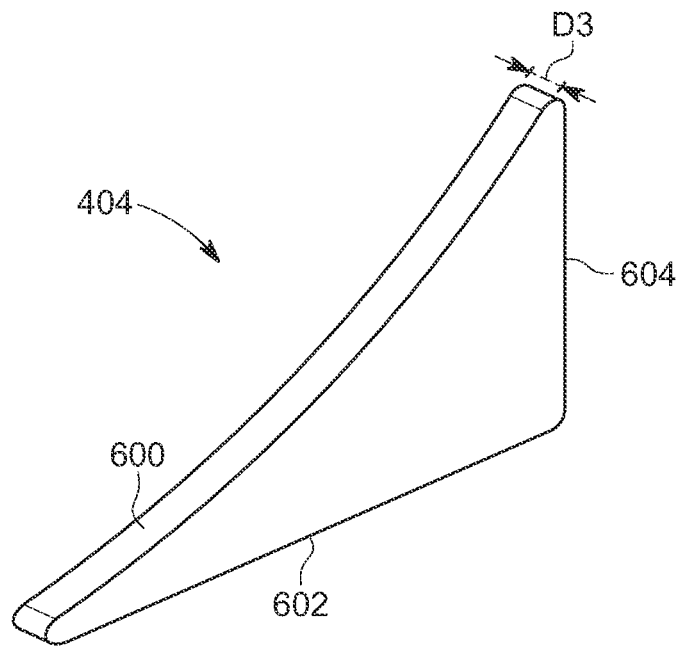
FIG. 6 is a perspective view showing another one of the elements in FIG. 4, according to certain aspects of the present disclosure.

FIG. 6 shows a perspective view of the diversion ramp 404, according to certain aspects of the present disclosure. The diversion ramp 404 includes a surface 600, a base 602, and a back 604. The surface 600 of the diversion ramp 404 diverts the cooling airflow 116 (FIG. 4) away from the aperture 304, generating the diverted airflow 410 (FIG. 4). The base 602 of the diversion ramp 404 couples the diversion ramp 404 to the board 110. The thickness D3 of the diversion ramp 404 generally is the same thickness as the spaces 202 (FIG. 2) between the components 200 so that the diversion ramp 404 can fit within the spaces 202. Alternatively, the thickness D3 can be the distance between an outer component 200 and the side wall 102 of the housing 100, if that distance is different that the space 202 between adjacent components 200.

Figure 7:
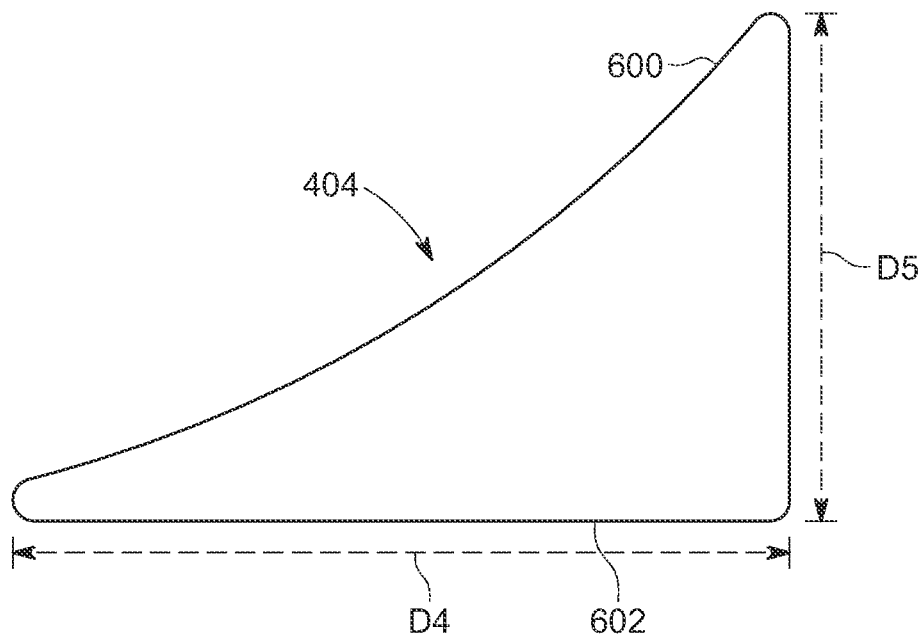
FIG. 7 is a side view showing the element of FIG. 6, according to certain aspects of the present disclosure.

Referring to FIG. 7, the surface 600 of the diversion ramp 404 can be any type of inclined surface that diverts the cooling airflow 116 (FIG. 4) away from the aperture 304. According to some embodiments, the surface 600 can be a curved surface. According to some embodiments, the surface 600 can be a quadratic curved surface.

The length D4 of the diversion ramp 404 can be various lengths. The height D5 of the diversion ramp 404 can be various heights. In a preferred embodiment, the ratio of the length D4 to the height D5 (i.e., D4/D5) is about 0.5 to about 5.

Figure 8:
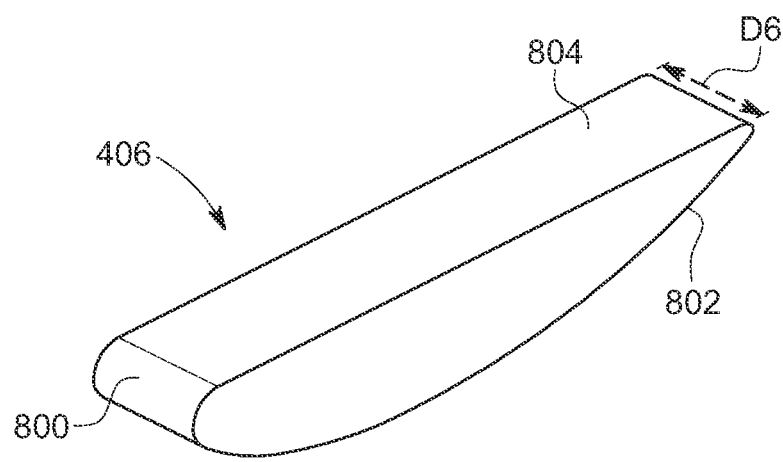
FIG. 8 is a perspective view of another one of the elements in FIG. 4, according to certain aspects of the present disclosure.
Figure 9:
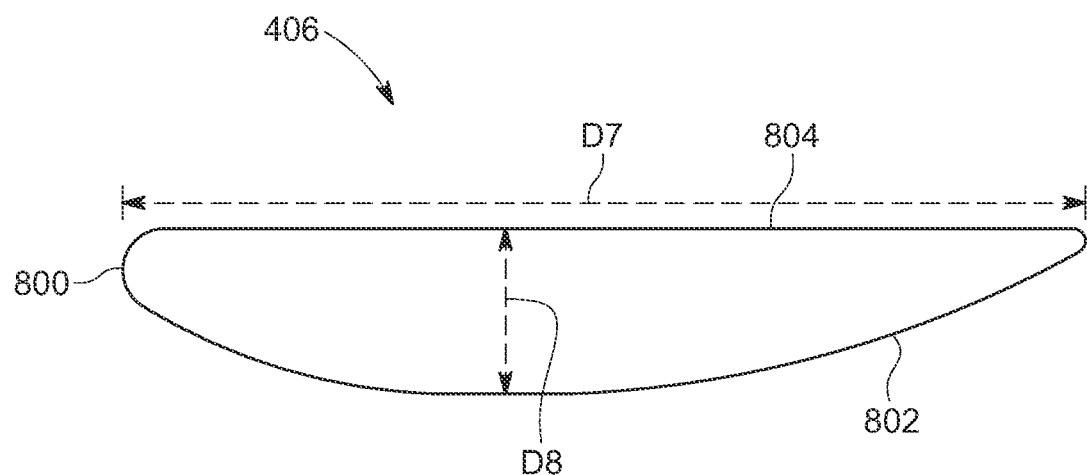
FIG. 9 is a side view showing the element of FIG. 8, according to certain aspects of the present disclosure.

FIG. 8 shows a perspective view of the airfoil 406, according to aspects of the present disclosure. The airfoil 406 includes a curved leading edge 800, a curved first surface 802 continuing from the curved leading edge 800, and a flat second surface 804 that extends from the curved leading edge 800 opposite from the curved first surface 802. The separated airflow 412 over the curved first surface 802 flows faster than the separated airflow 412 over the flat second surface 804. This assists in passing airflow through the housing 400. The airfoil 406 creates a pressure difference based on Bernoulli's law. Hot air flow lifted by diversion ramp 404 can be further lifted, and accelerated, by airfoil 406 to direct air flow up to the top wall 104 of the housing 100. As such, the location of the airfoil 406 is downstream from and above the diversion ramp 404. In a preferred embodiment, the airfoil 406 can be at least about 50 mm away from the diversion ramp 404.

Referring to FIGS. 4 and 8, the curved first surface 802 (FIG. 8) is arranged within the housing 400 to face towards the aperture 304 (FIG. 4), and the flat second surface 804 (FIG. 8) is arranged to face away from the aperture 304 (FIG. 4). According to some embodiments, the flat second surface 804 (FIG. 8) is arranged generally oblique to the top wall 104 and the bottom wall 106 of the housing 400 (FIG. 4). According to some embodiments, the flat second surface 804 (FIG. 8) is arranged to direct diverted airflow 410 further away from the aperture 304 (FIG. 4).

Referring back to FIG. 8, the thickness D6 of the airfoil 406 generally is the same thickness as the spaces 202 (FIG. 2) between the components 200 so that the airfoil 406 can fit within the spaces 202. Alternatively, the thickness D6 can be the distance between an outer component 200 and the side wall 102 of the housing 100, if that distance is different that the space 202 between adjacent components 200. The length D7 of the airfoil 406 can be various lengths. In a preferred embodiment, the length D7 is about 10 to about 12.5 times the thickness D6. The height D8 of the airfoil 406 can be various heights. In a preferred embodiment, the height D8 is about 1.5 to about 3 times the thickness D6.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A system comprising:
a housing having a top wall, a bottom wall, and two opposing side walls extending substantially between and connecting the top wall to the bottom wall, the housing further having an airflow inlet and an airflow outlet opposing the airflow inlet;
a plurality of components within the housing, the plurality of components arranged in rows with spaces between the rows;
a board coupled to the plurality of components on a first side and coupled to the bottom wall of the housing on a second side, opposing the first side, the board including an aperture, the board and the bottom wall of the housing defining a channel; and
an airfoil located within one of the spaces between the rows and configured to separate housing airflow flowing through the housing within the one of the spaces between the rows containing the airfoil.

2. The system of claim 1, further comprising an injection ramp located within the channel and configured to direct channel airflow from within the channel, through the aperture, and between the plurality of components, wherein the injection ramp includes a curved surface that is configured to direct the channel airflow from within the channel, through the aperture, and between the plurality of components.

3. The system of claim 2, wherein the injection ramp includes a column that divides the curved surface into a first side curved surface and a second side curved surface, opposite the column from the first side curved surface.

4. The system of claim 3, wherein the first side curved surface and the second side curved surface have airflow entrances that are wider than airflow exits such that the channel airflow over the first side curved surface and the second side curved surface accelerates between the airflow entrances and the airflow exits.

5. The system of claim 4, wherein the column includes curved side column surfaces such that the first side curved surface and the second side curved surface have the airflow entrances that are wider than the airflow exits.

6. The system of claim 2, wherein a width of the injection ramp is approximately equal to a width of the aperture.

7. The system of claim 1, further comprising a diversion ramp coupled to the first side of the board and located within one of the spaces between the rows of the plurality of components upstream from the aperture, the diversion ramp being configured to divert the housing airflow through the housing away from the aperture, wherein the diversion ramp includes a base coupled to the first side of the board and a curved surface substantially opposite the base that is configured to divert the housing airflow away from the aperture.

8. The system of claim 7, wherein the curved surface has a shape of a quadratic curve.

9. The system of claim 7, wherein a width of the diversion ramp is approximately equal to a width of the one of the spaces between the rows of the plurality of components containing the diversion ramp.

10. The system of claim 1, wherein the airfoil includes a curved leading edge, a curved first surface continuing from the curved leading edge, and a flat second surface that extends from the curved leading edge opposite from the curved first surface.

11. The system of claim 10, wherein the curved first surface faces towards the aperture and the flat second surface faces away from the aperture.

12. The system of claim 10, wherein the flat second surface is arranged approximately oblique to the top wall and the bottom wall of the housing.

13. The system of claim 12, wherein the flat second surface is arranged to direct housing airflow away from the aperture.

14. The system of claim 1, wherein a width of the airfoil is approximately equal to a width of the one of the spaces between the rows plurality of components containing the airfoil.

15. The system of claim 1, further comprising an injection ramp located within the channel and configured to direct channel airflow from within the channel, through the aperture, and between the plurality of components.

16. The system of claim 1, further comprising a diversion ramp coupled to the first side of the board and located within one of the spaces between the rows of the plurality of components upstream from the aperture.

17. A system comprising:
a housing having an airflow inlet and an airflow outlet opposing the airflow inlet;
a plurality of components arranged in rows with spaces between the rows;
a board including an aperture, the board and the housing defining a channel;
an injection ramp located within the channel and configured to direct channel airflow from within the channel, through the aperture, and between the plurality of components;
a diversion ramp coupled to the board and located within one of the spaces between the rows upstream from the aperture, the diversion ramp being configured to divert housing airflow through the housing away from the aperture; and
an airfoil located within one of the spaces between the rows and configured to separate the housing airflow within the one of the spaces between the rows containing the airfoil.

18. A method comprising:
diverting housing airflow through a housing away from an aperture, the housing having an airflow inlet and an airflow outlet opposing the airflow inlet, the aperture being included in a board that defines a channel with the housing, a plurality of components being arranged within the housing in rows with spaces between the rows;
directing channel airflow from within the channel, through the aperture, and between the plurality of components; and
separating the housing airflow via an airfoil located within one of the spaces between the rows, the housing airflow being separated within the one of the spaces between the rows containing the airfoil.

* * * * *